(12) United States Patent
Fjeldstad et al.

(10) Patent No.: US 6,765,677 B1
(45) Date of Patent: Jul. 20, 2004

(54) METHOD AND DEVICE FOR NON-DESTRUCTIVE REAL-TIME MEASUREMENTS OF RESIDUAL STRESSES IN PLANAR AND NON-PLANAR OBJECTS

(75) Inventors: John Petter Fjeldstad, Sandefjord (NO); Irina Evgenievna Fjeldstad, Sandefjord (NO); Leonid Mikhailovich Lobanov, Kiev (UA); Vjacheslav A. Pivtorak, Kiev (UA); Galina Ivanovna Tkachuk, Kiev (UA); Sergey G. Andrushchenko, Kiev (UA); Irina V. Kijanets, Kiev (UA); Valeriy A. Pavlov, Kiev (UA); Nikolay A. Davidenko, Kiev (UA); Nikolay G. Kuvshinsky, Kiev (UA)

(73) Assignee: Holotech A.S., Sandefjord (NO)

( * ) Notice: Subject to any disclaimer, the term of this patent is extended or adjusted under 35 U.S.C. 154(b) by 45 days.

(21) Appl. No.: 09/717,306

(22) Filed: Nov. 22, 2000

(30) Foreign Application Priority Data

Oct. 25, 2000 (NO) .......................................... 2000 5376

(51) Int. Cl.[7] .............................................. G01B 9/02
(52) U.S. Cl. ..................................... 356/458; 356/35.5
(58) Field of Search .............................. 356/35.5, 457, 356/458

(56) References Cited

U.S. PATENT DOCUMENTS

| | | |
|---|---|---|
| 3,960,448 A | 6/1976 | Schmidt et al. |
| 4,798,466 A | 1/1989 | Bouteyre et al. |
| 5,339,152 A | 8/1994 | Horn |
| 6,094,260 A * | 7/2000 | Rockstroh et al. .......... 148/510 |
| 6,522,409 B1 * | 2/2003 | Fjeldstad et al. ........... 356/457 |

FOREIGN PATENT DOCUMENTS

| NO | 20002601 | 6/2000 |
|---|---|---|
| WO | WO 0131286 A2 | 5/2001 |
| WO | WO 01/31289 A1 | 5/2001 |

OTHER PUBLICATIONS

A. A. Antonov, *Welding Engineering, Development of the technique and equipment for the holographic evaluation of the residual stresses in welded constructions*, vol. 12, pp26–28, (1983).

* cited by examiner

Primary Examiner—Frank G. Font
Assistant Examiner—Michael A. Lyons
(74) Attorney, Agent, or Firm—Birch, Stewart, Kolasch & Birch, LLP

(57) ABSTRACT

This invention relates to a method and device for performing non-destructive measurements of residual stresses in an investigation area of an object based on use of optical holographic interferometry technique. The holographic interferometer is divided into a holographic probe which contains means for illuminating the investigation area of the object by coherent light, collecting the coherent light that scatters off this investigation area and means for performing a non-destructive dislocation release pulse of the residual stresses in a small region of the investigation area by exposing the object to an electric high currency, and a holographic camera which contains means for formation, registration, and development of a hologram and for formation of an interferogram of the investigation area of the object. The object coherent light is sent from the light source to the probe by a single-mode light guidance cable, from the probe to the holographic camera by an other single-mode light guidance cable, and the reference coherent light from the light source to the holographic camera in a third single-mode light guidance cable. In this way, one is allowed to measure residual stresses on surfaces of an object with high curvatures, in hardly accessible places, and under many weather conditions by a simple hand-held manual positioning of the holographic probe during the measurements.

23 Claims, 5 Drawing Sheets

US 6,765,677 B1

METHOD AND DEVICE FOR NON-DESTRUCTIVE REAL-TIME MEASUREMENTS OF RESIDUAL STRESSES IN PLANAR AND NON-PLANAR OBJECTS

FIELD OF INVENTION

This invention relates to a method and device for non-destructive measurements of residual stresses and loading stresses which is based on optical holographic interferometry technique, where the holographic interferometer is divided into a hand-held holographic probe which is being installed on the object that is to be investigated and a holographic camera which may be situated in a protected in-door environment. The hand-held holographic probe allows to measure residual stresses on surfaces of an object with high curvatures, in places where access is difficult, and under many weather conditions by a simple hand-held manual positioning of the holographic probe during the measurements.

BACKGROUND

Optical holographic interferometry technique is well suited for measuring residual stresses caused by technological processes of welding, forging, soldering etc. as well as stresses in an object during the object's work load.

These applications are useful for fields such as offshore oil industry, shipping industry, air industry, process industry, and all types of constructions where loading stresses and residual stresses are vital or fatigue may cause a problem.

An example of the state of the art for measuring residual stresses in an object by holographic interferometry is given in the journal: "Welding Engineering" 1983, vol. 12, p. 26–28. The article describes a typical device for measuring residual stresses which elements, including a laser, optical elements of a holographic interferometer, and a registering medium are rigidly connected between each other by a common metallic basis for protection against vibrations. Also, the operation of the device is based on optical holographic interferometry technique. The device should be installed onto an investigation object during measurements.

The principle of the residual stress measurements by means of this device can be described as follows: First, a hologram of the investigation area of the object is recorded and developed on a registering medium. Further, the residual stresses in a point of the investigation area of the object is released by drilling a small and shallow hole in the object. Then the registering medium with the developed holographic image and the investigation area of the object with the drilled out hole are simultaneously illuminated by the reference and object beams respectively. An interferogram of the investigation area of the object is formed as a result of interference of the two light waves scattered by the object under its illumination with an object beam before and after drilling the hole.

In the case of a welded seam, for instance of an aluminum plate, the interference pattern consists of two pairs of mutually perpendicular lobes which indicate directions of the main residual stresses, namely in longitudinal ($Q_{zx}$) and in transverse ($Q_{yy}$) direction of the welded seam. From the interferogram one can determine the normal components of the surface displacement at the hole edge ($W_x$ and $W_y$), which are equal to the respective number of interference fringes observed in the chosen direction multiplied by one half of the wavelength and divided by the sine of the incidence angle of the object beam. The main stresses are determined by using the above values of $W_x$ and $W_y$ from simplified theoretical expressions which presume that the depth of the drilled out hole ($h_s$) is less or equal to its radius ($r_s$):

$$Q_x = \frac{W_x}{W_{1x}}[r_1/r_s]\{E/E_{AL}\} \quad (1)$$

$$Q_y = \frac{W_y}{W_{2x}}[r_1/r_s]\{E/E_{AL}\} \quad (1)$$

where $W_{1x}$, $W_{2x}$ are parameters equal to the normal components of the surface displacement at the hole edge along the X-axis for unity values of stresses applied first in the X-axis direction (when determining $W_{1x}$) and, then in the Y-axis direction (when determining $W_{2x}$), and which is obtained from the theoretical dependencies of $W_{1x}$, $W_{2x}$ on the co-ordinate from the center of the hole for different ratios between $r_s$ and $h_s$, under unity stress for the studied material. $E$, $E_{AL}$, and $r_1$, are elasticity modules of the studied material and aluminum and the unity radius, respectively.

However, the above mentioned device has essential drawbacks:

1) It is necessary to drill holes in the object that is to be investigated for residual stresses. Thus the method is a destructive test, and is obviously not acceptable for a variety of objects and applications.

2) The device does not allow the evaluation of residual stresses in the real-time scale due to use of silver-halide-based photographic emulsions as the registering media. These requires large development times.

3) The device enables only indoor measurements, c.f. under workshop comfortable conditions.

4) The device enables measurements only on horizontal surfaces with a weak curvature, and it does not allow to perform measurements on inclined and vertical surfaces and on hardly accessible places of the investigation object.

An attempt to eliminate the mentioned drawbacks was made in the device for measuring residual stress, described in U.S. Pat. No. 5,432,595 to Pechersky. This device is similar to the device described above, but the release of the residual stresses is achieved by heating the investigation point by radiating it with the infrared (IR)-pulse.

However, this device does also suffer from considerable drawbacks which can be summarized as follows:

1) Deviation of the energy distribution over the IR-pulse cross-section from a rectangular shape as well as the heat dissipation from the investigation point of the object irradiated with the IR-pulse results in a blurring out of the boundaries of the spot where the release of residual stresses occurs. This excludes the use of expression (1) and (2) for quantitative evaluation of residual stresses from the measurements of normal components of the surface displacement. It also makes it difficult to obtain analytical expressions for subsequent quantitative determinations of residual stresses from the measurements of normal components of the surface displacement, and makes the assignment of the determined residual stress of a particular point of the object difficult.

2) Due to the heating of the investigation point up to the transition temperature into the plastic state where the residual stresses are released, the action of residual stresses localized outside of the heated spot will deform the surface of the object, not only in the vicinity of the heated spot but also within the spot itself. This is an additional confirmation for the above given conclusion that this device does not allow the use of the analytical expressions given in equation (1) and (2), since these assume that the stress release occurs in a spot with sharp boundaries and no deformation within the region with released stresses. Further, the problem of obtaining new analytical expressions for quantitative determinations of residual stresses is very complicated due to the uncertainty in the determination of the boundaries of the region of stress release and the deformation of the region of stress release. This allows one to assume that the considered device can only be used, at best, to reveal residual stresses.

3) New stresses are created by structural changes in the irradiated spot which occurs during heating up to the transition temperature by the IR-pulse. These new stresses together with residual stresses localized outside the region of residual stress release, should deform the irradiated region and its surroundings as well.

Therefore it becomes impossible, from the distribution of normal displacement components outside the irradiated spot, not only to quantitatively determine the residual stresses, but even to determine the directions of the main residual stresses.

Thus, none of the considered drawbacks, also including the fist one has not been overcome in the device described above. Thus, the device cannot be considered as a non-destructive device.

The first mentioned drawback has been overcome in a device for measuring residual stresses, where a "dislocation" release of the residual stresses was employed (see applicants corresponding Norwegian application no. 20002601). Let us consider this device and stages of its operation in more detail with reference to FIGS. 1–3. The device includes of an optical device (101) and an electronic device for a "dislocation" release of residual stresses (111) with electric current supply electrode (114). The optical device (101) is intended for formation and registration of holograms from an area of the object as well as for formation of interferograms of the above area after releasing the residual stresses. It includes of a coherent light source (102), a holographic interferometer with optical elements (103–104) for formation of a reference (105) and object (106) beam, and a recording medium (107). All components in the optical device (101) are rigidly connected with regard to each other. The optical device also includes a device (108) for positioning and fixation on the object (109). The electronic device for "dislocation" release of residual stresses (111) with an electric current supply electrode and clamping device (114), is intended for non-destructive release of residual stresses within a certain area (the investigation area) of an object. The electronic device comprises a generator (110) which is able to deliver high-current rectangular pulses (pulse parameters are within the range: amplitude 1–10 kA, duration 20 $\mu$s–20 ms and recurrence frequency 0–100 Hz) and an electric current supply electrode with clamping device (114) connected to the generator. The base of the electric current supply electrode is made as a half-sphere with radius 1.5–5 mm. Both the electric current supply electrode (114) and clamping device are located structurally in the optical device (101).

The method for performing non-destructive determination of residual stresses with this device can, as the methods of prior art, be divided into three stages; registration of a hologram of the investigation area of the object, release of residual stresses in a very small region of the investigation area, and formation of an interferogram from the investigation area containing a region with released residual stresses. The interferogram can be employed to determine the normal components of the displacement of the surface at the boundary of the region with released residual stresses, which in turn can be employed to calculate the released residual stresses by using analytical expressions (1) and (2).

A detailed description of this method for performing non-destructive determinations of residual stresses is given in Norwegian application no. 20002601, and is incorporated here by reference. All we need to know is that when the initial hologram of the investigation area of the object (109) is formed and registered, the electric current supply electrode (114) is raised in its upper position in a distance above the investigation area. This constitutes the first stage (see FIG. 1). Then the electric current supply electrode (114) is lowered until a junction between the investigation point of the object and electrode is established, and a pulse of electric current is sent through this junction in order to perform the "dislocation" release of the residual stresses in a small region (0.5–1 mm) of the investigation area of the object. During exposure to the electric pulse, an energy transfer from directionally traveling electrons to the dislocations occurs. This phenomena as well as the magneto-dynamical effect of the percussion compression of the investigation area (in which the electron stream is passing) leads to the directional movement of the dislocations, to the decrease of their concentrations and to the release of residual stresses. The release of residual stresses is thus carried out without causing a transition of the material into a plastic state, and it can be done in a region with a sharp boundary. This constitutes the second stage (see FIG. 2). Finally, the current supply electrode is raised to its upper position, and a interferogram from the investigation area of the object is formed in the third stage (see FIG. 3).

The residual stress measurements by the above given device was checked under determination of the normal components of the surface displacement at the edge of the region of dislocation release of residual stresses in a welded seam of flat aluminum plates and subsequent usage of these components for calculations by expressions (1) and (2). These results were compared with measurements on the same weld obtained by the device using hole drilling for residual stress release. Measured residual stresses differed by not larger than 20%.

Thus, the described device allows to perform non-destructive measurements of residual stresses using therewith the world-widely collected experience in calculating the residual stresses by employing the analytical expressions given in equations (1) and (2), as well as results on experimental determination of normal components of the surface displacement at the boundary of the region of stress release.

There are however still considerable drawbacks which limit a wide use of this technique:

1. When installed on the investigation object the device occupies considerable space of the surface of the investigation object comparing to the region of stress release and requires the creation of special multipurpose clamping devices for its installation on the investigation object; this limits the application of the device for inclined and vertical surfaces and makes its usage impossible for curved surfaces and for a variety of hardly accessible areas of the object which generally need to be investigated.

2. The necessity of fixing the device on inclined and vertical surfaces reduce the efficiency of the device operation.

3. The device does not allow performing measurements of residual stresses under arbitrary weather conditions due to peculiarities of operation of the registering media based on amorphous molecular semiconductor (AMS) films which require comfortable conditions for charging of AMS film surface with corona discharge and for development of holograms (see, for instance, the Norwegian patent application 20002948).

OBJECT OF INVENTION

The main object of the invention is to provide a device for non-destructive real-time measurement of residual stresses in materials by optical holographic interferometry technique which overcomes the above mentioned drawbacks.

The object of invention is also to provide a device for non-destructive real-time measurement of residual stresses in materials by optical holographic interferometry technique which enables to perform the measurements of residual stresses on inclined and vertical surfaces of the object and for practically all variety of hardly accessible places of objects without requiring any fastening devices.

The object of invention is also to provide a device for non-destructive real-time measurement of residual stresses in materials by optical holographic interferometry technique which enables to perform the measurements of residual stresses under any weather conditions.

SHORT DESCRIPTION OF THE FIGURES

Figure 1:
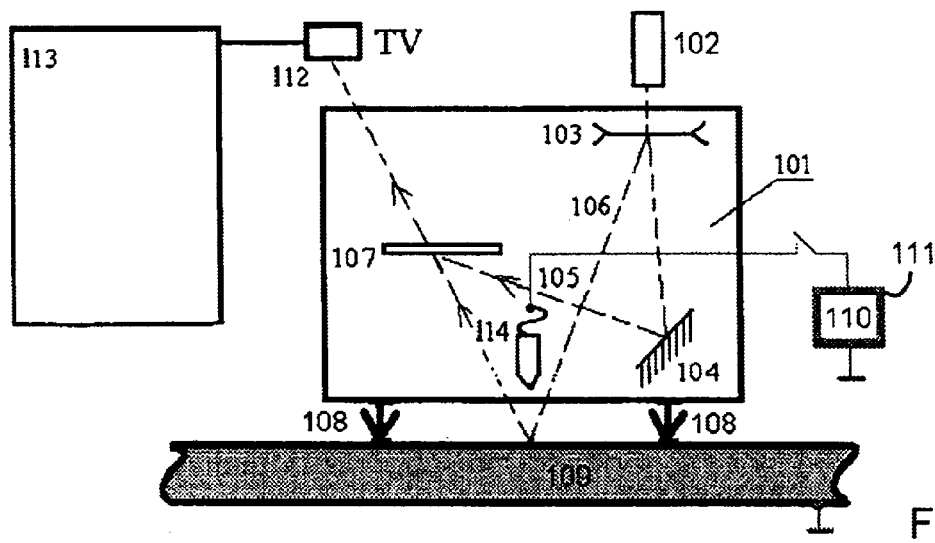
FIG. 1 is a schematic drawing of the device for non-destructive measurement of residual stresses by optical holographic interferometry according to Norwegian patent application no. 20002948. The figure shows the first stage of the device's operation for non-destructive determination of residual stresses, namely, the registration and development of the hologram.
Figure 2:
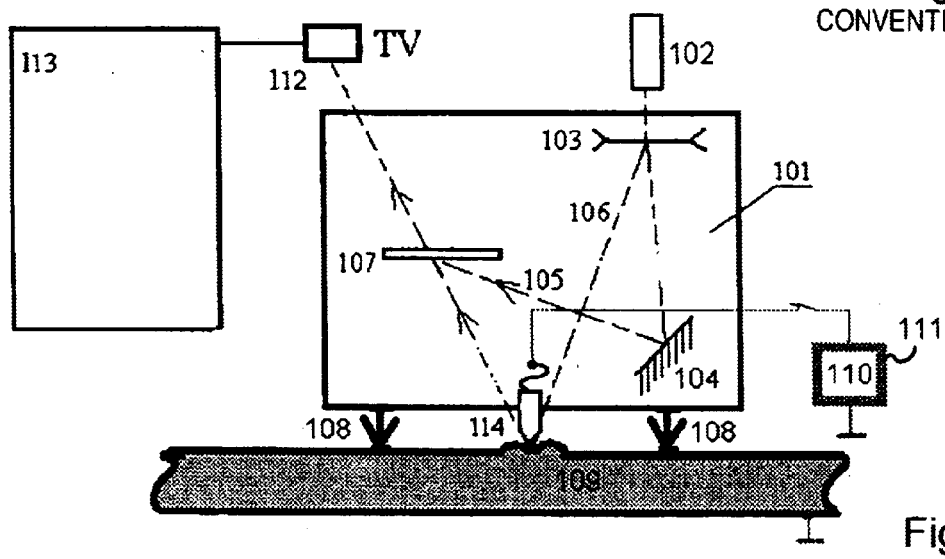
FIG. 2 is a schematic drawing of the device for non-destructive measurement of residual stresses by optical holographic interferometry according to Norwegian patent application no. 20002948. The figure shows the second stage of the operation of the device, namely, non-destructive dislocation release of residual stresses in a small region of the investigation area of the object.
Figure 3:
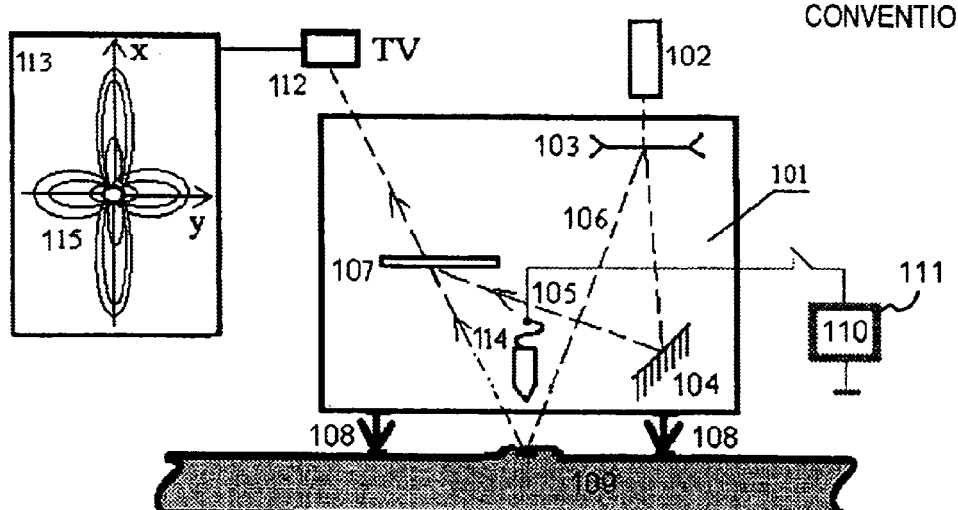
FIG. 3 is a schematic drawing of the device for non-destructive measurement of residual stresses by optical holographic interferometry according to Norwegian patent application no. 20002948. The figure shows the third stage of the operation of the device, namely, obtaining of the interferogram of the investigation area of the object.
Figure 4:
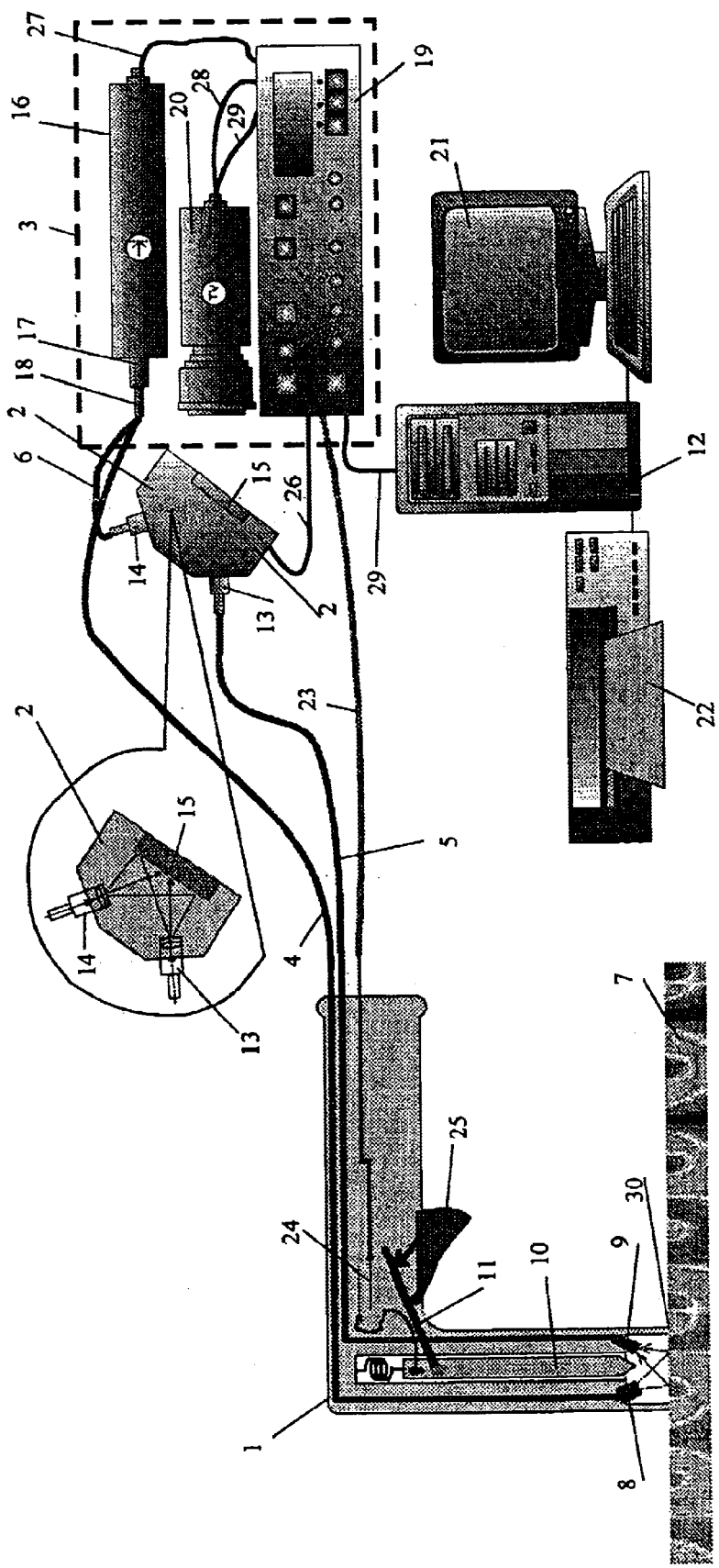

FIG. 4 shows a preferred embodiment of a device for non-destructive real-time measurement of residual stresses by optical holographic interferometry according to the present invention. The figure shows the first stage of the operation of the device, namely, the registration and development of the hologram of the investigation area of the object. The inset in the top part of the figure shows the optical scheme of the holographic camera.

Figure 5:
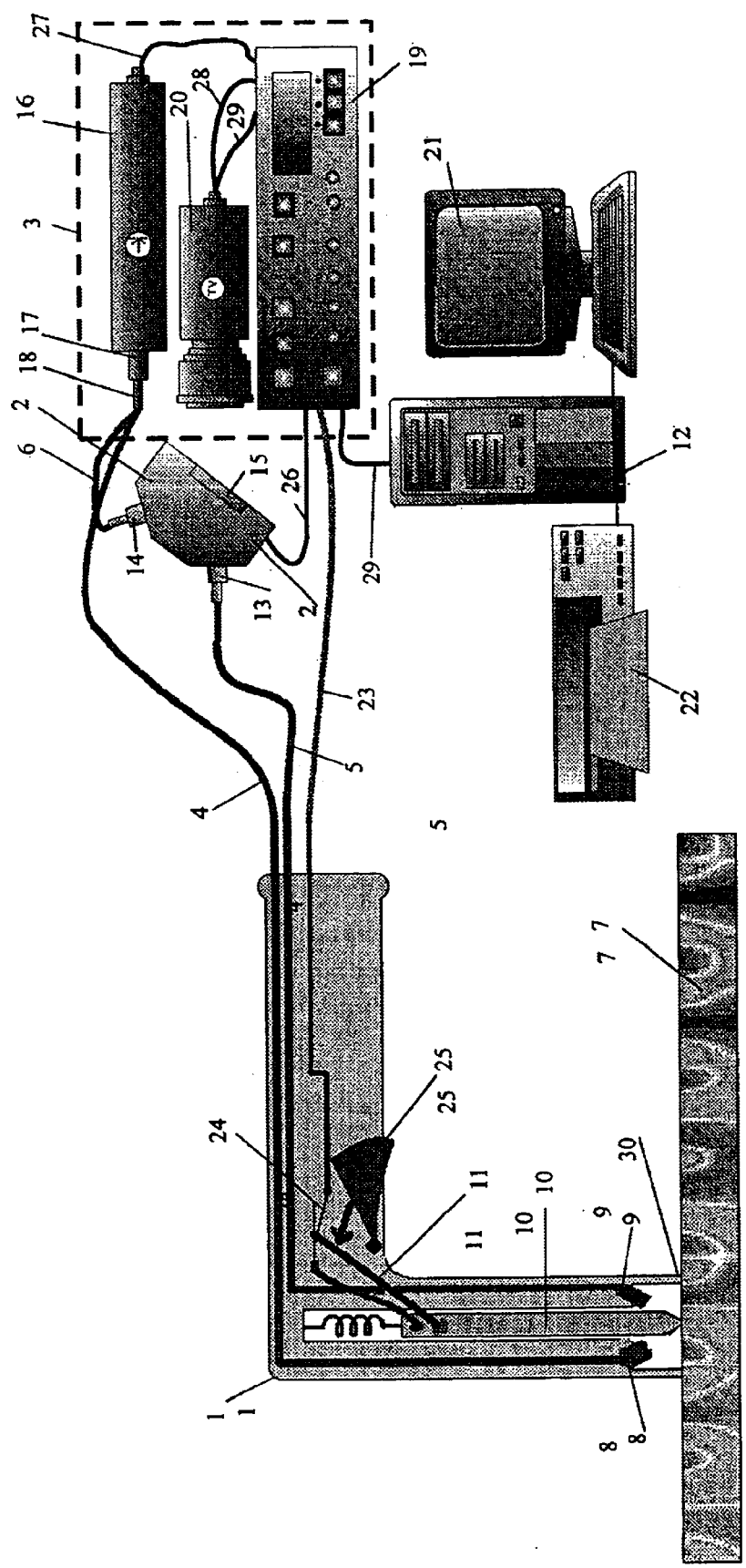

FIG. 5 shows a preferred embodiment of a device for non-destructive real-time measurement of residual stresses by optical holographic interferometry according to the present invention. The figure shows the second stage of the operation of the device, namely, the release of residual stresses in a small region of the investigation area of the object.

Figure 6:
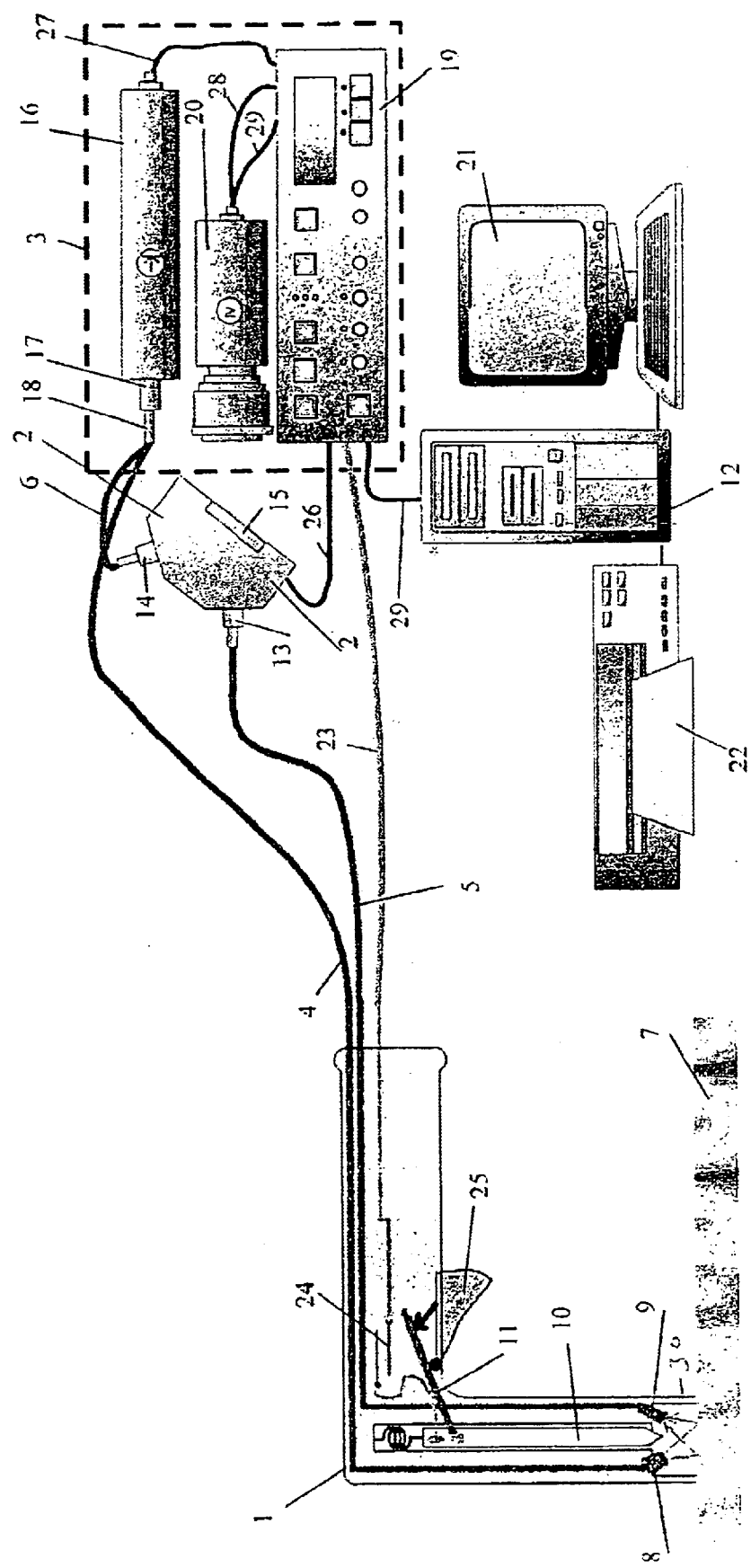

FIG. 6 shows a preferred embodiment of a device for non-destructive real-time measurement of residual stresses by optical holographic interferometry according to the present invention. The figure shows the third stage of the operation of the device, namely, obtaining of the interferogram.

Figure 7:
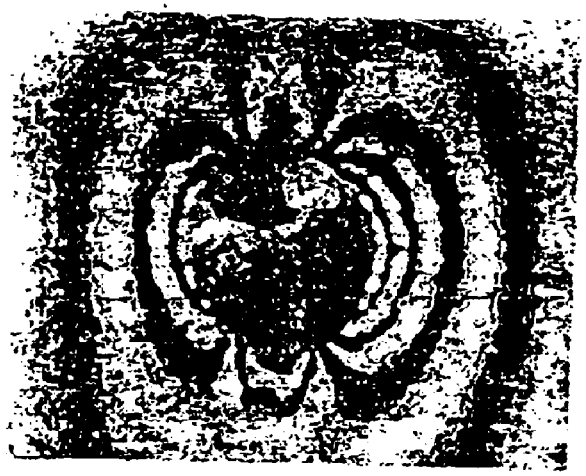

FIG. 7 is a photograph of the interferogram of the investigation area of the welded joint of two flat aluminium plates containing an area with released residual stresses which is obtained with the use of the device according to the present invention.

BRIEF DESCRIPTION OF THE INVENTION

The objectives of the present invention can be achieved by a method and a device as described in the appended claims and in the description given below.

Non-destructive measurements of residual stresses on inclined and vertical surfaces, surfaces with great curvature, in places where access is difficult of an object under any weather conditions can be achieved by dividing the device into a holographic probe, a holographic camera, and a light source of coherent light, which are optically connected with each other by single-mode light guidance cables (the holographic probe and holographic camera constitutes a holographic interferometer). The holographic probe contains means for illuminating the investigation area of the object with the object coherent light, for collecting the object coherent light which scatters off the investigation area of the object, and means for supplying a high-current electric pulse to the region which is to be relieved of residual stresses. In addition to the holographic interferometer and light source, the device for non-destructive real-time measurements of residual stresses may contain auxiliary electronic and optoelectronic units for controlling the registering medium, the device for residual stress release, for computer processing of the interferogram, etc.

By employing single-mode light guidance cables we achieve that the holographic probe becomes a separate part of the holographic device for performing nondestructive measurements of residual stresses which is free to move in relation to the holographic camera and/or the light source within the limits defined by the length of the single-mode light guidance cables. Then the need for installing the entire holographic interferometer with light source onto the investigation object is eliminated, and one can thus manage by only attaching the relatively small-sized holographic probe onto the investigation object. It is preferred to employ single-mode light guidance cables to connect the probe to the camera and light source, since this ensures that movements of the probe in relation to the camera and/or light source does not affect the optical path length (as long as the movement are within the limits defined by the length of the cables). Thus it becomes possible to place the temperature and humidity sensitive holographic camera and auxiliary equipment in a comfortable and protected environment, while the holographic probe can freely be employed at hardly accessible and weather exposed places of the investigation object. The benefits and principle solution of transporting the object and reference coherent light to and from the holographic equipment and the object that is to be investigated, is thoroughly discussed in the applicant's Norwegian patent application no. 20002724, and is incorporated here as a reference.

Further, it is preferred to design the holographic probe as a self-contained holographic device with a narrow confined geometry which contains two optical connectors, a retrievable current supply electrode, and a spacer portion (to ensure a fixed distance between the optical connectors and the surface of the investigation object). The first of these optical connectors is connected to the single mode optical light guidance cable which transmits the object coherent light from the light source to the object, while the second optical connector is connected to the single mode optical light guidance cable which transmits the object coherent light from the object to the holographic camera. Both optical connectors are rigidly fastened to the optical probe such that any movements relative to each other are excluded. Also, the first connector is fastened such that it spreads the object coherent light over the investigation area, while the second connector is fastened such that it collects the light which scatters off the investigation area. The retrievable electric current supply electrode is connected to an electric high-power source and is equipped with means for establishing a junction with the surface of the investigation object in order to apply high-current electrical pulses to a small region of the surface of the investigation object.

In this way we achieve that the holographic probe becomes suited to be employed on any curved surface and/or in hardly accessible places on an object, and can also be manually held in place by hand during the measurements. Thus, the probe does not require a clamping or holding device for securing a fixed optical path length of the object coherent light. This is obviously a vast improvement since all prior art known to us requires such clamping or holding devices for fixing the entire holographic equipment onto the object which is to be investigated. Thus, prior art requires careful planning and considerable labour, and is also restricted to investigating easily accessible areas of an object with small curvatures. In addition, the prior art is also restricted to indoor measurements or fair weather in case of outdoor measurements. With the present invention, one can easily and fast measure any surface of an object (as long as the probe is able to make contact with the surface) in many weather conditions by simply moving the probe by hand from one position of the object to another.

The remaining part of the holographic interferometer and light source are also interconnected by single-mode light guidance cables and optical connectors. The principle and physical design of these are described thoroughly in the applicants Norwegian patent application no. 20002724 and is incorporated here by reference.

DETAILED DESCRIPTION OF THE INVENTION

The invention will now be described in greater detail as a preferred embodiment of the invention under reference to FIGS. 4–7, where the optical device and block diagram of the device for measurement of residual stresses and optical scheme of the holographic camera (only in FIGS. 4, 6) are presented. The figures show three stages of operation of the device during measuring the residual stresses. FIG. 7 shows a photograph of the interferogram obtained with the use of the device according to the present invention.

The device includes of a holographic probe (1), holographic camera (2), control unit (3), and single-mode light guidance cables (4), (5) and (6). The holographic probe (1) is installed and kept manually by the operator on the investigation area of object (7) during measurements of residual stresses, and it contains a spacer portion (30), two optical connectors (8) and (9) and a current-supply electrode (10) with means (11) for putting it into junction with the surface of the investigation area of the object (7).

The holographic camera (2) is installed separately from the holographic probe (1) in another place under comfortable conditions, as a rule, together with a control unit (3) and minicomputer (12). It includes two optical connectors (13) and (14) and a recording medium (15).

As mentioned, the control unit (3) is also placed separately from the holographic probe in another place under comfortable conditions. The control unit (3) includes a source of coherent light (16) with an optical connector (17) and a beam splitter (18), a power supplier for the coherent light source, a power supplier for the TV-camera, a device for controlling the operation of the recording medium, and a generator of high-current electric pulses arranged in a single case (19) of the control unit, and a TV-camera with objective (20).

In addition, the device for measurement of residual stresses includes a minicomputer (12) with display (21) and a printer (22). As one can see from FIGS. 4–6, in the preferred embodiment of the invention, the optical connector (17) is connected in one end to the source of coherent light (16), and the other end is connected to the beam splitter of coherent light (18). The single-mode light guidance cable (4) is connected in one end to beam splitter (18), and the other end is connected to optical connector (8). The single-mode light guidance cable (5) is in one end connected to optical connector (9), and the other end is connected to optical connector (13). The single-mode light guidance cable (6) is in one end connected to the beam splitter (18), and the other end is connected to optical connector (14). The electric cable (23) is in one end connected to the current supply electrode (10) via the contact group (24) and the lever (25), and the other end is connected to the generator of high-current electric pulses located inside the single case (19) of the control unit. The electric cable (26) is in one end connected to the recording medium (15), and the other end is connected to the device for controlling the recording medium operation located inside the single case (19) of the control unit. The electric cable (27) is in one end connected to the source of coherent light (16), and the other end is connected to the power supplier of the coherent light source located inside the single case (19) of the control unit. The electric cable (28) is in one end connected to the TV-camera (20), and the other end is connected to the power supplier for the TV-camera (20) located inside the single case (19) of the control unit. The electric cable (29) is in one end connected to the TV-camera (20), and in the other end to the minicomputer.

The holographic probe (1) is installed by an operator on the investigation object in such a manner that optical connector (8) illuminates the investigation area of object (7) (see FIG. 4), and the optical connector (9) collects the light scattered by the investigation area of the object. Optical connectors (13), (14) are located in the holographic camera (2) such that optical connector (13) forms the object beam (see FIG. 4) and send it to the surface of recording medium (15), and optical connector (14) forms the reference beam and send it to the surface of recording medium (15).

In this preferred embodiment of the invention, it is important that the optical connector (17) and the beam splitter of coherent light (18) are rigidly fixed on the coherent light source (16), that the optical connectors (8) and (9) are rigidly connected with regard to each other on the holographic probe (1), that the holographic probe (1) is installed by the operator on the investigation area of the object in such a way that it could not move relative to the investigation area of the object during the investigation, i.e. from the moment of registration of the hologram and until the moment when the interferogram has been formed, and that optical connectors (13), (14) and recording medium (15) are rigidly connected with regard to each other in the holographic camera (2) at fixed distances determined by specific requirements for formation and registration of the hologram. It is also important that the electric current supply electrode (10) is arranged in the holographic probe in such a way that after installing the holographic probe on the investigation area of the object, it could easily be put into junction with the surface of the investigation area of the object without causing any displacements or vibrations of the holographic probe.

Such an embodiment of the device for non-destructive real-time measurement of residual stresses by optical holographic interferometry allows to design the device as comprising two major parts. One of which is the holographic probe installed and kept manually by the operator on the investigation area of the during the measurements, while the other part is the holographic camera situated separately from the investigation object in another place under comfortable conditions. Aiso, an auxiliary part, the control unit, may be situated separately from the investigation object, in another place, as a rule, together with the holographic camera. In this case, the holographic probe during the measurements can be easily moved by operator along surface of the investigation object within the limits of lengths of single-mode light guidance cables without causing changes in the optical path lengths for the coherent light used for formation of the object and reference beams.

And thus, it is allowed to register and develop the hologram and to form the interferogram of the investigation area of the object in comfortable conditions.

Further, we consider the operation of the device for a non-destructive real-time measurement of residual stresses by optical holographic interferometry according to the present invention. The procedure of registration and development of holograms is described in details in applicants corresponding Norwegian application no. 20002948. Here it is only necessary to note that amorphous molecular semiconductor (AMS) films consisting of 91 wt % of a co-polymer comprising epoxypropylcarbazole and 5 wt % buthylglycedil ether doped with 3–5 wt % of 9-(4-dodecyl-oxyphenyl-1,3-selenathiol-2-ylidene)-2,5,7-trinitrofluorene-4-carboxylate and 1–5 wt % of hexadecyl-2,7-dinitro-dicyanometllylenfluorene-4-carboxylate, were used as the recording medium (15). Properties of AMS-films and determination of the optimal composition of the films are described in details in applicants corresponding Norwegian application no. 19995273 which is included here as a reference.

The operation of the device for non-destructive real-time measurements of residual stresses with the use of optical holographic interferometry according to the present invention includes three stages.

The First Stage (See FIG. 4).

In the first stage, the registration of the hologram of the investigation area of the object is performed. The holographic probe (1) is installed on the investigation area of the object (7). The coherent light source (16) is switched on and the recording medium (15) is prepared to make a registration. Coherent light from the coherent light source (16) is sent through the optical connector (17) to the splitter of coherent light (18), where it is divided into the object-and reference coherent light. The object coherent light is delivered by the single-mode light guidance cable (4) to the optical connector (8) located in the holographic probe (1) where it is expanded and sent onto the investigation area of the object (7). The object coherent light scattered by the investigation area of object (7) is collected by optical connector (9) located in the holographic probe (1) and is sent into the single-mode light guidance cable (5). With the use of the single-mode light guidance cable (5), the object coherent light is delivered to the optical connector (13) located on the holographic camera (2). Further, with the use of optical connector (13), the object coherent beam is formed from the delivered object coherent light and is sent onto the surface of the recording medium (15). At the same time, the reference coherent light is delivered by the single-mode light guidance cable (6) to the optical connector (14) on the holographic camera (2). Then, with the aid of optical connector (14), the reference beam is formed from the delivered reference coherent tight and is directed onto the surface of the recording medium (15). The reference and the object beams interfere on the surface of recording medium (15) and form a hologram of the investigation area of the object. This hologram is registered and developed by the recording medium (15).

The Second Stage (See FIG. 5).

In the second stage, the non-destructive dislocation release of residual stresses is performed in a small region of the investigation area of the object (7). The operator, with the aid of lever (25), lowers the electric current supply electrode (10) until a junction with the surface of the investigation area of object (7) is obtained, and a high-current electric pulse is passed through a small region of the investigation area of the object (7) by closing the switch (24). The method and device for performing non-destructive dislocation release of residual stresses by electric pulses is thoroughly described in the applicants corresponding Norwegian application no. 20002601 and is incorporated here by reference. All we need to know is that the electric pulse heat up the small region of the investigation area until the dislocation release of the residual stresses occur.

The Third Stage (See FIG. 6).

In the third stage, the formation of the interferogram of the investigation area of the object is performed. This stage immediately follows the second stage as soon as the operator, by the aid of lever (25), removes the electric current supply electrode from the junction with the surface of the investigation area of the object and retrieves it to its upper position. Then the investigation area of the object (7) containing the region of residual stress release becomes illuminated with the object coherent light, and the recording medium (15) containing the developed holographic image of the investigation area of the object will be illuminated with the reference beam. As a result, two light waves will simultaneously be present behind the recording medium. One of these waves corresponds to the light wave scattered by the investigation area of the object when it is illuminated by the object coherent light prior the release of residual stresses, and the other corresponds to the light wave scattered by the investigation area of the object under its illumination with the object coherent light after release of residual stresses in a small region of the investigation area of the object. These light waves interfere and form the interferogram of the investigation area of the object with the region of residual stress release, which can be observed with the naked eye when watching on the investigation area through the recording medium, or by a TV-camera with an objective (20).

An interferogram of the investigation area of the welded joint of two flat aluminium plates obtained with the use of the device according to the present invention is shown in FIG. 7 as an example. A single pulse of electric current with 1.8 kA amplitude and 2 ms duration was employed to perform the dislocation release of residual stresses through the junction between the electric current supply electrode and surface of the investigation area. This interferogram was completely identical to the interferogram obtained for the same area of the object with the use of the prior-art device for non-destructive measurements of residual stresses in which all optical elements of holographic interferometer and the recording medium were rigidly connected with regard to each other by the common metallic basis, and which was installed on the investigation object. The method of dislocation release of residual stresses was also used for performing measurements in the latter case and we also used the pulse of electric current of 1.8 kA amplitude and 2 ms duration passed through the junction of the electric current supply electrode with the surface of the investigation area of the object.

Although the invention has been described by way of a preferred embodiment, it is should not be construed as limited by this embodiment. There are of course possible to give the holographic probe numerous designs in order to adapt it to all kinds of metallic objects of any thinkable shape and form which need investigation for residual tensions. These designs are all obvious for a skilled person and lies within the scope of this invention.

What is claimed is:

1. A method for performing measurements of residual stresses in an investigation area of an object by use of optical holographic interferometry technique, in which a device used to perform the measurement includes:

a coherent light source and a registering medium arranged in a environment at a distance from the object which is to be investigated;

a first single-mode light guidance cable that transmits the coherent light from the light source to the investigation area of the object that is to be investigated in such a manner that it illuminates the investigation area;

a second single-mode light guidance cable that transmits the coherent object light, which scatters off the investigation area of the object which is to be investigated from the investigation area to the registering medium in such a manner that it illuminates the registering medium; and a stress relief device that induces a release of the residual stresses at the object in situ while the formation, registration and development of the holographic image and formation of the interferogram of the investigation area of the object are performed in said environment, the method comprising:

registering and developing a hologram of the investigation area of the object on a registering medium;

subjecting a small region of the investigation area of the object to a release of the residual stress;

forming an interferogram of the investigation area of the object by simultaneously illuminating the registering medium containing the developed holographic image of the investigation area of the object in the initial state and the investigation area of the object containing the region of released residual stresses with the reference and object beams, respectively, wherein the interferogram is formed as a result of interference between the two light waves which corresponds to the light waves scattered off the investigation area of the object before and after release of the residual stresses, and transmitting the coherent light between the object, light source, and holographic camera in single-mode light guidance cables, wherein the endpoints of the single-mode light guidance cables are securely attached in a fixed distance of the investigation area of the object and the recording medium thereby protecting the formation of the holographic image and interferogram of the investigation area from mutual relative displacements of the object, holographic camera and the light source.

2. The method according to claim 1, wherein the step of subjecting the small region of the investigation area of the object to the release of the residual stress includes exposing the investigation area of the object to a electric current pulse.

3. The method according to claim 1, wherein the step of registering and developing the hologram image and the step of forming the interferogram of the investigation area are performed in an environment suited for an operation of amorphous molecular semiconductors.

4. A device for measurements of residual stresses of an object by optical holographic interferometry technique comprising:

a source of coherent light;

a holographic interferometer;

a recording medium;

a device for release of residual stresses; and auxiliary devices for observing and processing of an interferogram, wherein the holographic interferometer is divided into a holographic probe comprising means for illuminating the investigation area of the object by coherent light, collecting the coherent light that scatters off the investigation area and means for performing a release of the residual stresses in a small region of the investigation area, and a holographic camera comprising means for formation, registration, and development of a hologram and for formation of an interferogram of the investigation area of the object, wherein the coherent light is transmitted from the light source to the probe by a first single-mode light guidance cable, from the holographic probe to the holographic camera by a third single-mode light guidance cable, and the reference coherent light transmitted from the light source to the holographic camera by a second single-mode light guidance cable, and wherein the holographic probe comprises a spacer portion, first and second rigidly connected probe optical connectors and an electric current supply electrode with means for putting the electric current supply electrode into junction with the investigation area of object, where the first probe optical connector is connected to the first single-mode light guidance cable, the second probe optical connector is connected to the third single-mode light guidance cable, and where the electric current supply electrode is connected to a generator of the electric pulses by means of electric cables.

5. The device according to claim 4, wherein the holographic probe has a narrow cylindrical shape in order to make the probe suitable for use in difficult to access places and for curved surfaces of the investigation area.

6. The device according to claim 4, wherein the holographic camera comprises first and second camera optical connectors and a recording medium which are rigidly connected and arranged at fixed distances relative to each other, where the first camera optical connector is connected to the second single-mode light guidance cable, and the second camera optical connector is connected to the third single-mode light guidance cable.

7. The device according to claim 4, wherein the first and second single-mode light guidance cables are connected to the source of coherent light via a splitter of coherent light.

8. A device for performing measurements of residual stresses of an object, comprising:

a control unit, wherein the control unit is configured to generate coherent light and split the coherent light into a reference beam and an object beam;

a probe connected to the control unit by a first light guidance cable, wherein the probe is configured to receive the object beam from the control unit, illuminate an investigation area of an object with the object beam, collect a reflected object beam from the investigation area, and induce a release of the residual stresses in the investigation area; and a holographic camera connected to the control unit by a second light guidance cable and connected to the probe by a third light guidance cable, wherein the holographic camera is arranged to receive the reference beam from the control unit, receive the reflected object beam from the probe, generate a hologram based on the reference beam and the reflected object beam, and generate an interferogram of the investigation area where in the probe is movable with respect to the control unit, wherein lengths of the first, second, and third light guidance cables are such that the cables ensure a fixed optical distance between the investigation area and the holographic camera.

9. The device of claim 8, wherein the control unit comprises:

a coherent light source configured to generate the coherent light; and a beam splitter configured to split the coherent light from the coherent light source to generate the reference and object beams, wherein the object beam is transmitted through the first light guidance cable and the reference beam is transmitted through the second light guidance cable.

10. A device for performing measurements of residual stresses of an object, comprising:

a control unit, wherein the control unit is configured to generate coherent light and split the coherent light into a reference beam and an object beam;

a probe connected to the control unit by a first light guidance cable, wherein the probe is configured to receive the object beam from the control unit, illuminate an investigation area of an object with the object beam, collect a reflected object beam from the investigation area, and induce a release of the residual stresses in the investigation area; and a holographic camera connected to the control unit by a second light guidance cable and connected to the probe by a third light guidance cable, wherein the holographic camera is arranged to receive the reference beam from the control unit, receive the reflected object beam from the probe, generate a hologram based on the reference beam and the reflected object beam, and generate an interferogram of the investigation area where in the probe is movable with respect to the control unit, wherein the probe comprises:

a probe object beam connector arranged to illuminate the investigation area with the probe object beam transmitted through the first light guidance cable;

a probe reflection beam connector configured to collect the reflected object beam from the investigation area and transmit the reflected object beam through the third light guidance cable; and a stress reliever arranged to induce the release of the residual stresses in the investigation area.

11. The device of claim 10, wherein relative positions of the probe object beam connector and the probe reflection beam connector are fixed.

12. The device of claim 11, wherein the probe further includes a spacer portion such that one or both of the probe object beam connector and the probe reflection beam connector are placed a fixed distance from the investigation area.

13. The device of claim 10, wherein the stress releaver is arranged to apply an electric current pulse to the investigation area.

14. The device of claim 10, wherein the holographic camera includes:

a camera reference beam connector arranged to project the reference beam transmitted through the second light guidance cable on to a recording medium; and a camera reflection beam connector arranged to project the reflected object beam transmitted through the third light guidance cable on to the recording medium.

15. The device of claim 14, wherein relative positions of the camera reference beam connector, the camera reflection beam connector, and the recording medium are fixed.

16. The device of claim 10, wherein the first, second, and third light guidance cables are single-mode light guidance cables.

17. A method to perform measurements of residual stresses of an object, comprising:

forming an initial hologram of an investigative area of an object using a device that includes a control unit, a probe connected to the control unit by a first light guidance cable, and a holographic camera connected to the control unit by a second light guidance cable and connected to the probe by a third light guidance cable;

inducing a release of the residual stresses in the investigation area using the device; and forming an interferogram of the investigation area using the device, wherein the step of forming the initial hologram of an investigative area of an object includes:

generating coherent light;

splitting the coherent light into a reference beam and an object beam;

illuminating the investigation area with the object beam transmitted through the first light guidance cable;

collecting a reflected object beam from the investigation area; and projecting the reference beam transmitted through the second light guidance cable and the reflected object beam transmitted through the third light guidance cable to a recording medium, and wherein the step of forming the interferogram of the investigation area includes performing the following steps after inducing the release of the residual stresses in the investigation area:

illuminating the investigation area with the object beam transmitted through the first light guidance cable;

collecting a reflected object beam from the investigation area;

projecting the reference beam transmitted through the second light guidance cable and the reflected object beam transmitted through the third light guidance cable to the recording medium; and interposing the projected image with the initial hologram, and wherein lengths of the first, second, and third light guidance cables are such that the cables ensure a fixed optical distance between the investigation area and the holographic camera.

18. The method of claim 17, wherein the step of inducing the release of the residual stresses in the investigation area includes applying an electric current pulse to the investigation area.

19. A device for performing measurements of residual stresses of an object, comprising:

controlling means including means for generating coherent light and means for splitting the coherent light into a reference beam and an object beam;

probing means including means for receiving the object beam from the controlling means, means for illuminating an investigation area of an object with the object beam, means for collecting a reflected object beam from the investigation area, and means for inducing a release of the residual stresses in the investigation area; and holographing means including means for receiving the reference beam from the controlling means, means for receiving the reflected object beam from the probing means, means for generating a hologram based on the reference beam and the reflected object beam, and means for generating an interferogram of the investigation area;

wherein the controlling means, the probing means, and the holographing means are connected to allow the probing means to move freely with respect to the controlling means, and wherein relative positions of the means for illuminating and the means for collecting are fixed.

20. A device of claim 19, wherein the device includes first, second, and third light guidance cables such that the first light guidance cable connects the controlling means and the probing means, the second light guidance cable connects the probing means and the holographing means, and the third light guidance cable connects the controlling means and holographing means.

21. The device of claim 19, wherein the means for inducing includes means for applying an electric current pulse to the investigation area.

22. The device of claim 19, wherein the means for generating the hologram includes:

means for recording;

means for projecting the reference beam to the means for recording; and means for projecting the reflected objected beam to the means for recording.

23. The device of claim 22, wherein relative positions of the means for recording, the means for projecting the reference beam, and the means for projecting the reflected objected beam are fixed.

* * * * *